(12) United States Patent
Young et al.

(10) Patent No.: US 7,038,182 B2
(45) Date of Patent: May 2, 2006

(54) MICROWAVE OVEN COOKING PROCESS

(75) Inventors: Robert C. Young, 301 E. 78th St., New York, NY (US) 10021; Johan Kools, Oudenbosch (NL)

(73) Assignee: Robert C. Young, Greenpoint, NY (US)

( * ) Notice: Subject to any disclaimer, the term of this patent is extended or adjusted under 35 U.S.C. 154(b) by 0 days.

(21) Appl. No.: 10/607,131

(22) Filed: Jun. 27, 2003

(65) Prior Publication Data

US 2004/0262301 A1 Dec. 30, 2004

(51) Int. Cl.
*H05B 6/80* (2006.01)
*A21D 13/00* (2006.01)

(52) U.S. Cl. .............. 219/730; 219/732; 219/725; 426/243; 426/107; 426/234

(58) Field of Classification Search ........ 219/725–735, 219/762; 99/DIG. 14; 426/241–243, 107, 426/109, 234, 523
See application file for complete search history.

(56) References Cited

U.S. PATENT DOCUMENTS

| | | | |
|---|---|---|---|
| 4,283,425 A | * | 8/1981 | Yuan et al. ............. 426/102 |
| 4,342,788 A | * | 8/1982 | Clatfelter ............... 426/243 |
| 4,641,005 A | | 2/1987 | Seiferth |
| 4,882,184 A | | 11/1989 | Buckholz et al. |
| 4,904,490 A | | 2/1990 | Buckholz, Jr. et al. |
| 4,927,991 A | | 5/1990 | Wendt et al. |
| 4,948,932 A | | 8/1990 | Clough |
| 4,963,376 A | | 10/1990 | Nafisi-Movaghar |
| 4,968,522 A | | 11/1990 | Steinke et al. |
| 4,985,261 A | | 1/1991 | Kang et al. |
| 5,043,173 A | | 8/1991 | Steinke et al. |
| 5,069,916 A | | 12/1991 | Buckholz et al. |
| 5,089,278 A | | 2/1992 | Haynes et al. |
| 5,091,200 A | | 2/1992 | Kang et al. |
| 5,124,519 A | | 6/1992 | Roy et al. |
| 5,164,562 A | | 11/1992 | Huffman et al. |
| 5,227,599 A | | 7/1993 | Mason et al. |
| 5,284,666 A | | 2/1994 | Graf |
| 5,286,504 A | | 2/1994 | Sheen et al. |
| 5,362,504 A | | 11/1994 | Kamper et al. |
| 5,389,759 A | | 2/1995 | Jay et al. |
| 5,414,248 A | | 5/1995 | Phillips |
| 5,458,898 A | | 10/1995 | Kamper et al. |
| 5,614,259 A | | 3/1997 | Yang et al. |
| 5,891,490 A | | 4/1999 | Merabet |
| 5,919,505 A | | 7/1999 | Monsalve et al. |
| 6,054,698 A | | 4/2000 | Mast |
| 6,139,885 A | | 10/2000 | Jouanneau et al. |
| 6,231,903 B1 | | 5/2001 | Ji et al. |
| 6,320,172 B1 | | 11/2001 | Watkins |
| 6,488,973 B1 | | 12/2002 | Wright |

FOREIGN PATENT DOCUMENTS

| | | |
|---|---|---|
| DE | 40 27 077 A1 | 3/1991 |
| GB | 2 228 662 | * 9/1990 |

* cited by examiner

*Primary Examiner*—Philip H. Leung
(74) *Attorney, Agent, or Firm*—Oliff & Berridge, PLC

(57) ABSTRACT

A microwave dry-fry cooking process includes the steps of providing a food product in or on a microwave cooking vessel and exposing the food product in or on the microwave cooking vessel to microwave energy in a microwave oven. The food product includes a food load and a coating composition coated on the food load, where the coating composition comprises at least one microwave-absorbing oil or fat.

28 Claims, 7 Drawing Sheets

MICROWAVE OVEN COOKING PROCESS

BACKGROUND OF THE INVENTION

1. Field of Invention

This invention relates to compositions and methods for improved microwave cooking, and particularly compositions and methods that provide fried foods in a microwave oven.

2. Description of Related Art

The use of microwave energy revolutionized food preparation and has now become common place, both in businesses and in the home. However, the advantages associated with microwave usage are tempered with compromises to food appearance, texture, flavor, and sometimes ease of preparation. In particular, although microwave energy can be used to cook foods, it lacks the ability to provide a crisping effect to the bakery or breaded/fried foods. Accordingly, a majority of uses of the microwave ovens is to reheat precooked (such as frozen) food products, rather than to cook uncooked food products in the first instance.

In the past, difficulties have been experienced in various attempts to brown or crispen food products in a microwave oven. A microwave oven heats foods differently from a conventional oven, which cooks the food entirely by radiant heat. Generally speaking, food substances are heated in proportion to their moisture content and absorption of microwave energy, which may result in considerably different heating patterns from those that exist in a conventional oven. Also, this dielectric heating by microwave radiation penetrates into most foods in a way that results in considerably different heating patterns from those that would otherwise be present in a conventional oven. In most cases, microwave energy will heat foods faster than in a conventional oven. For example, a food substance that might require 30 minutes to properly "cook" or reheat in a conventional oven, may take only 3 or 4 minutes to "cook" or reheat in a microwave oven. In a conventional oven, the oven atmosphere is heated to relatively high temperatures to transfer heat to the food surface resulting in the surface always being the hottest area in the food. In a microwave oven, the oven atmosphere is generally not heated; the food itself heats and transfers heat to the surrounding air and in some cases resulting in the outer surface of the food being cooler than the interior or having a soggy surface as the heated interior moisture and steam travel through the outer pastry layers. These differences significantly affect one's ability to brown or crispen a surface of a food product in a microwave oven as the food surface is not exposed to conventional or radiant heat.

To compensate for the microwave oven's inability to crisp and brown the surface of foods, and to prevent foods that are highly absorptive of microwave energy from being overheated, resulting in toughening and dehydration of the food, two specific "microwave active" packaging components have been developed: microwave susceptors and microwave shields.

Microwave shields are devices that do not heat appreciably in response to microwave energy, but reflect virtually all incident microwaves. Metallic foils are generally employed as microwave shields, which has the effect of shielding the food from microwave energy.

In contrast, microwave susceptors are devices that heat in response to microwave energy, converting microwave energy into thermal energy to produce radiant heat that can provide a browning and/or crisping effect to food surfaces placed in contact with the microwave susceptors. Microwave susceptors thus convert a portion of the incident microwave energy into conventional or radiant heat, which assists in cooking the food product's outer surface. Such cooking occurs by any of conduction, convection and/or radiant heating, in addition to the cooking obtained from the microwave radiation itself that has passed through the susceptor laminate. Susceptors may generally comprise almost any portion of the cooking and/or packaging surfaces, and have suitably been employed in the forms of the cooking surfaces of kitchen utensils, the bottom of packaged food products, such as unpopped popcorn, incorporated into folding cartons or trays, and a food wrap for a food product, such as meat-filled sandwiches, bread, and pastry-type products, which when cooked desirably should have a browned or crisped exterior surface.

Because of the above-described problems with browning and crisping foods in microwave ovens, the goal in the art of susceptors had been, and still is, to make the susceptor so that it generates the highest temperatures and most radiant heat possible. This goal was used because generation of the highest temperature possible also tends to mean that the cooking or heating time can be shortened, which is a primary advantage of microwave ovens. Furthermore, when a food load is close to the susceptor surface, heat can be transferred to the food as fast as it is produced by the susceptor.

Susceptors frequently comprise or are included in the packaging for food products as a convenience to the consumer, so that the consumer can simply place the product into a microwave oven without any significant preparation. As a further convenience, such packaging is customarily disposable. Thus, there is a particular need for susceptors that are economical.

However, since susceptors will be brought into contact with foods intended for human consumption, it is necessary to encapsulate the microwave interactive material within films or the like that are approved for contact with food, thus resulting in a multi-layer susceptor product. Such multi-layer products are generally known in the art, and have taken many forms. Customarily, the susceptor product comprises a base sheet such as paper, cellophane, cardboard, box board or the like, a thin layer of microwave interactive material, such as aluminum and/or other selected metals, combinations of metals, alloys and oxides, and a heat resistant barrier film overlying the thin metal layer.

The multi-layer sheet may then be die cut, folded into cartons or pressed into preformed trays or containers and/or decorated with printing to form a package into which food may be inserted by a food processor. Alternatively, the multi-layer sheet may comprise a flexible laminate, which can be formed around a food product as a wrapping material at the food processor's plant. Alternatively, susceptor laminations may be configured as a variety of flexible paper or paper board structures, such as wraps, bags, pouches, sleeves, trays, pads, discs, sleeves, patches, liners, lids, and other designs that would enable the home user and food processor to utilize susceptor materials for their own microwave suitable foods.

The barrier film is typically a polyester (PET) film, due primarily to its heat resistant properties and low cost. However, the barrier film may also be polyimide, cellulose, polyethylene nitrile and other heat resistant films. Its purpose is to provide a functional barrier between the food product and as a carrier for the susceptor metal, and sometimes also to serve as a carrier for a sealable layer to facilitate formation of a package.

The microwave interactive susceptor material is typically a metal, combinations of metals, metal alloy, metal oxide, or derivatives and/or combinations thereof, in single or multi-layer formations, but also may be ceramic or carbon. Any element or compound that absorbs the electromagnetic microwave energy, either electrical and/or magnetic wave forms, and converts it to radiant heat is suitable. The metals are usually applied by using evaporative, sputtering, or electron-beam deposition methods. The metals may also be applied using such suitable methods as printing or gravure processes, and combinations of pre-selected designs of shielding and susceptor patterns and designs can be manufactured by controlled acid etching. Flakes and slurries of susceptor materials, which may be controlled acid etched to provide variations in susceptor radiant heat, are sometimes applied in a rotary printing process. Ceramics and carbon may also be applied in a rotary printing process.

Typically, the susceptor is formed by depositing a film or layer of the microwave interactive material onto the barrier film, e.g., a web of polyester film, followed by laminating the metallized film onto a web of supporting substrate material, usually board, paper or cellulose.

Numerous variations of susceptor materials and manufacturing methods have been proposed and disclosed in the art. For example, various susceptor designs are disclosed in, for example, U.S. Pat. No. 4,641,005 to Seiferth, U.S. Pat. No. 5,614,259 to Yang et al., U.S. Pat. No. 5,164,562 to Huffman et al., U.S. Pat. No. 4,927,991 to Wendt et al., U.S. Pat. No. 5,124,519 to Roy et al., and U.S. Pat. No. 5,414,248 to Phillips, the entire disclosures of which are incorporated herein by reference.

However, despite the numerous approaches that have been made to susceptor materials, microwave cooking still presents a drawback that has not been adequately addressed in the art. In particular, microwave cooking still does not provide cooking results comparable to conventional cooking methods, for a wider variety of food products. For example, microwave cooking does not provide comparable results to frying for breaded goods, raw meats, raw vegetables, raw dough, and the like. Likewise, microwave cooking does not provide comparable results to conventional methods in providing crispy cooked products, that have the taste, texture, and appearance of conventionally cooked foods.

One approach in the art to address these concerns has been to provide various coating compositions, which can be applied to a food product to provide a crispy and/or colored outer appearance to the food product. For example, U.S. Pat. No. 5,227,599 to Mason et al., the entire disclosure of which is incorporated herein by reference, discloses a microwave cooking bag and method in which a food product in the bag is cooked, browned and crisped in a microwave oven.

U.S. Pat. No. 6,139,885 to Jouanneau et al., the entire disclosure of which is incorporated herein by reference, discloses a preparation of breads and bread products prepared by heating with microwaves and also to use of a susceptor-lined cooking vessel in combination with one or more microwave energy absorbing oils or fats to provide a soft texture in the bread crumb and a crisp texture in the crust of the slice of bread.

U.K. Patent Publication No. GB 2,228,662A to Schiffmann et al., the entire disclosure of which is incorporated herein by reference, discloses a method and apparatus for browning a variety of foodstuffs in a microwave oven. The browning is achieved by the combination of treating at least one surface of the food product with a coating, packaging of the product in a container having a microwave susceptor, and heating in a microwave oven.

U.S. Pat. No. 5,389,759 to Jay et al., the entire disclosure of which is incorporated herein by reference, discloses a microwave container having coated on at least part of the inner surface thereof a browning agent for transfer of a brown coloration to the surface of a food item.

U.S. Pat. No. 5,286,504 to Sheen et al., the entire disclosure of which is incorporated herein by reference, discloses a microwave cooking process for producing food with a crisp exterior and a soft, tender interior. The process includes applying an edible hydrophilic lossy susceptor to at least a portion of the surface of the food, wherein the susceptor including glycerin, sucrose ester, and chloride salt; and microwave cooking the susceptor bearing food to a provide a crisp exterior.

In a similar manner, a number of references are directed to improved methods for microwave popping of popcorn. For example, U.S. Pat. No. 6,320,172 to Watkins, the entire disclosure of which is incorporated herein by reference, discloses a microwave popcorn bag with a susceptor and cooking oil.

SUMMARY OF THE INVENTION

However, despite the many approaches that have been taken in improving microwave cooking results, the need continues to exist for improved microwave cooking processes and materials, to provide better cooking results. In particular, the need continues to exist for improved microwave cooking processes and materials that provide a browning and crisping effect to the food product, comparable to results in conventional baking and frying, particularly for either cooking raw foods or for reheating frozen fried, pastry and bakery type foods including meat, fish, vegetables, and various pastry and bakery type products.

The present invention satisfies these needs, by providing a microwave dry-fry cooking process and coating composition. By "dry-fry" as used herein is meant a process and related coating composition that provides a microwave cooked product that cooks in the same manner and provides comparable results (in terms of texture, crispiness, and the like) as, a conventional frying process, but without the need for a large quantity of hot oil, fat or the like.

In particular, the present invention provides a microwave dry-fry cooking process, comprising:

providing a food product in or on a microwave cooking vessel, wherein said food product comprises a food load and a coating composition coated on said food load, said coating composition comprises at least one microwave-absorbing oil or fat; and exposing said food product in or on said microwave cooking vessel to microwave energy in a microwave oven.

BRIEF DESCRIPTION OF THE DRAWINGS

These and other advantages and features of this invention will be apparent from the following, especially when considered with the accompanying drawings, in which.

DETAILED DESCRIPTION OF PREFERRED EMBODIMENTS

Figure 1:
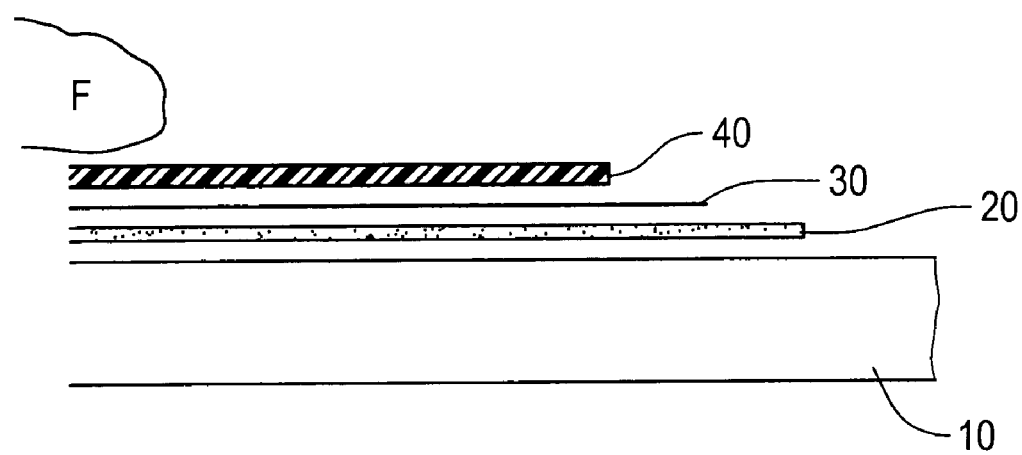
FIG. 1 shows the layers of a susceptor material.

The microwave cooking method of the present invention generally provides a dry-fry process, i.e. a frying method, which is conducted in the microwave but without the need for a large quantity of oil or fat as in conventional frying processes. The method generally comprises coating a food product with a dry-fry cooking composition, and cooking the coated food product in a microwave oven.

First, the coating composition will be described. The coating composition of the present invention comprises at least one microwave-absorbing fat or oil, and optional additives.

The microwave-absorbing fat or oil absorbs microwave energy during the cooking process. The absorbed energy causes the fat or oil to heat, preferably up to a temperature where the fat or oil provides a frying action to the food in contact with the fat or oil. Thus, for example, the microwave-absorbing fat or oil should absorb sufficient microwave energy in a sufficiently short amount of time to raise the temperature of the fat or oil up to about 175 to about 300° C. At this temperature, the fat or oil fries the food product, while the food product at the same time is cooking due to its own absorption of microwave energy, and due to radiant heat generated by the susceptor. Preferably, the temperature of the fat or oil is raised up to about 195 to about 250° C. Preferably, according to the claimed invention, the microwave-absorbing fat or oil reaches its cooking temperature of from about 175 to about 300° C. in less than about two minutes. Preferably, the microwave-absorbing fat or oil reaches its cooking temperature in less than about one minute, and even more preferably in less than about 45 seconds.

The fat or oil used in the coating composition of the present invention can be any suitable microwave-absorbing fat or oil, and can be provided in any suitable form. According to the invention, the fats and oils can be derived from any source, as desired, including from plant sources, animal sources, and synthetic sources. Thus, in the present disclosure, the terms "oil" and "fat" are sometimes used synonymously. "Oil" generally refers to a fatty material, which is present in liquid form at normal room temperatures, whereas "fat" generally refers to a fatty material that is present in a more solid form at normal room temperatures; however, it will be understood that the scope of these terms may overlap. Such fatty materials may thus be in liquid, soft solid, or solid form at room temperature, and would soften or liquefy upon heating. Fats, however, may include hard fats selected from animal fats and vegetable or fish oils. Hard fats may be selected from coconut oil, corn oil, cottonseed oil, fatty-pork tissue, lard, palm oil, shortenings, safflower oil, sunflower oil, tallow, palm fat, or any mixtures or equivalents thereof. It is to be understood, however, that the fat may have liquid oils ultimately mixed with hard fats. Preferred liquid oils include coconut oil, corn oil, cottonseed oil, safflower oil, soybean oil, sunflower oil, palm oil, rape seed oil, or mixtures or equivalents thereof. It is to be understood when it is desirable to confer certain animal flavor notes to foodstuffs, fatty materials may be selected from those fats and oils derived from animals. On the other hand, where more neutral or other flavoring is to be achieved, vegetable oils or fats may be employed.

Preferably, in consideration of ease of use of the composition, the oil or fat is solid at room temperature, but liquefies or melts at a temperature between about 20 and 45° C. Such oils and fats are easier to work with in that they can be melted and applied to the food product, but then can be re-solidified for storage and freezing. By remaining in solid form during storage, the oil or fat better remains in place in the coating composition around the food product. Of course, the invention is not limited to such embodiments. One skilled in the art will recognize that liquid oils or fats can be used, for example, where the oil or fat is applies closer to the time of cooking, or where the oil or fat assumes more solid properties due to its mixture with other components.

The coating composition of the invention can comprise additional ingredients, in addition to the microwave-absorbing oil or fat. Such additional ingredients can include, but are not limited to, browning agents, flavorants, coloring agents, fillers, breading ingredients, emulsifiers, surfactants, solvents, mixtures thereof, and the like. Such various additives are well known in the art, and can be suitably selected based on the desired properties of the final coating composition, and the properties that are desired to be imparted to the food product by the coating composition. Examples of such additives are disclosed in, but are not limited to, U.S. Pat. Nos. 4,882,184, 4,904,490, 4,963,376, 4,968,522, 4,985,261, 5,043,173, 5,069,916, 5,089,278, 5,091,200, 5,362,504, 5,389,759, 5,458,898, 5,891,490, and 6,139,885, the entire disclosures of which are incorporated herein by reference.

Furthermore, it is emphasized that the coating composition of the invention is not limited to bread-type or crunchy/crispy-type coating compositions. That is, while the coating composition of the present invention can include bread materials, such as bread crumbs, cracker crumbs, and the like, batter components, or crispy/crunchy materials such as granules of material that provide a crispy or crunchy taste, texture, and/or appearance, none of these need to be included in the composition. Thus, for example, the coating composition can be entirely comprises of the microwave-absorbing fat or oil, or can contain other additives depending on the food product to be cooked. For example, buffalo-style or Cajun-style compositions, more equivalent to sauces, can be used to cook food according to the present invention.

In embodiments of the present invention, the microwave-absorbing oil or fat is included in the coating composition in any suitable amount compared to the other ingredients of the coating composition. Likewise, any desired additives to the coating composition can be present in any desired and conventional amount for their purposes. Preferably, the microwave-absorbing oil or fat is included in the coating composition in such an amount that the oil or fat will be present in an amount of from about 1% to about 20% by weight of the total food product to which the coating is applied. Preferably, the microwave-absorbing oil or fat is included in the coating composition in such an amount that the oil or fat will be present in an amount of from about 5% or from about 8% to about 15% or about 18% by weight of the total food product to which the coating is applied.

A microwave cooking method using the coating composition will now be described. According to the present invention, the cooking method is a dry-fry cooking process. In this process, the coating composition provides a supply of microwave-absorbing oil or fat, which when sufficiently heated provides a frying cooking process, but within the context and constraints of a microwave oven. It is deemed a "dry" process in that a very minimal amount of oil or fat is used, as compared to the large amount of oil or fat required in conventional frying processes.

In practicing the process, a food load or food product is provided, which is coated with a dry-fry coating composition, such as the coating composition described above. As desired, the coating composition can be applied directly to the food product immediately before cooking, or it can be pre-applied to a food product well in advance of the cooking time. Thus, for example, the coating composition can be applied by a ready-to-cook food product manufacturer, where the food product is coated, packaged and stored for an extended period, or the coating composition can be applied by the end-user or consumer, who would apply the coating composition to a food product as part of meal preparation. The cooking process of the invention is thus equally applicable to pre-prepared products, which can be frozen, refrigerated or otherwise stored prior to use, as it is applicable to point-of-use preparation, such as for home or restaurant use.

The food product that can be coated with the coating composition and subjected to the cooking process of the present invention is not particularly limited. Thus, the invention can be applied to raw (i.e., uncooked) food products, partially cooked food products, or pre-cooked products, where the microwave cooking process is intended to cook, completely cook, or simply re-heat, respectively, the food product.

With respect to raw foods, the present invention can be used to cook or re-heat meat products, including, but not limited to seafood (including but not limited to fish, shellfish, and the like), poultry, beef, pork, processed meats (such as sausage, scrapple and the like), combinations thereof, and the like; vegetables, including, but not limited to, potato products (raw, or processed such as in the form of hash browns, French fries and the like), yams, corn, tomatoes, onions, peppers, leafy green vegetables, broccoli, cauliflower, carrots, combinations thereof, and the like; fruits, including, but not limited to, apples, pears, berries, combinations thereof, and the like; dough-based products, such as breads, rolls, fritters, combinations thereof, and the like; baked products, such as cakes, cookies, muffins, sweet rolls, pretzels, combinations thereof, and the like; and so forth. Combinations of the above products can also suitably be used in the present invention, such as, by way of example only, sandwiches, breaded meats, breaded fruits and/or vegetables, and the like. Such products can be raw (with or without skin, with or without a separate coating mix such as a batter coating or the like), or can be partially or fully-cooked.

When applied to the food product, the coating composition can be applied to the food product in any suitable manner consistent with the food product. Thus, for example, where the coating composition is solid at room temperature, it can be applied in solid or liquid form. When applied in solid form, it can be applied by dusting the composition on the food product (when available in a powder or powder-like form), by spreading it on the food product (when in a soft, butter-like form), and the like. When applied in liquid form, either at room temperature or when heating a solid material to a higher temperature to soften or liquefy the composition, the composition can be applied to the food product by any suitable method, including but not limited to, spraying, basting, brushing, dipping, soaking, combinations thereof, and the like. Furthermore, in embodiments, the coating composition can be applied in a manner similar to an oven-baking coating composition, i.e., by separately placing a food product and an amount of the coating composition into a vessel such as a bag, and shaking or kneading the total contents to adhere the coating composition to the food product.

As mentioned above, the microwave-absorbing oil or fat is preferably included in the coating composition and the coating composition is then preferably applied to the food product in such an amount that the oil or fat will be present in an amount of from about 1% to about 20% by weight of the total food product to which the coating is applied. Preferably, the microwave-absorbing oil or fat is included in the coating composition in such an amount that the oil or fat will be present in an amount of from about 5% or from about 8% to about 15% or about 18% by weight of the total food product to which the coating is applied.

Furthermore, as appropriate for the food product, the present invention can be practiced either by coating the coating composition onto the food product, or by placing an amount of the coating composition into or onto a cooking vessel along with the food product. Thus, for example, the present invention can be practiced by cooking a coated food product, or it can be practiced by placing the food product and the coating composition, probably in liquid form, into or onto the cooking vessel much like a frying pan would be used in conventional cooking. Preferably, the coating composition is applied to the food product as described above. In the latter embodiment, however, the coating composition will perform its cooking function as the microwave-absorbing oil or fat is heated up and becomes excited by the microwave and radiant energy.

As a cooking vessel, any suitable packing, container or vessel can be used. Thus, suitable cooking vessels include a plate, a disk, a pair of plates or disks intended to be disposed on different or opposite sides of a food product, a wrap product intended to be wrapped (loosely or fittingly) about the food product, a box or carton, a bag, a bowl, a covered or uncovered microwave cooking container, or the like. However, it is preferred that a microwave susceptor material be incorporated into all or part of the cooking vessel. As is known in the art, the microwave susceptor material absorbs a portion of the incident microwave energy, and converts that absorbed energy into radiant energy by heating up the susceptor material. Accordingly, a microwave susceptor assists the cooking process by adding a radiant energy component to the cooking process. A wide range of susceptor materials are known in the art, and can be readily applied to the present invention. Thus, for example, the susceptor containing cooking vessel can be, but is not limited to, a multi-layer sheet that is die cut, folded into cartons or pressed into preformed trays or containers and/or decorated with printing to form a package into which food may be inserted by a food processor or the end-user. Alternatively, the multi-layer sheet may comprise a flexible laminate, which can be formed around a food product as a wrapping material at the food processor's plant. Alternatively, susceptor laminations may be configured as a variety of flexible paper or paper board structures, such as wraps, bags, pouches, sleeves, trays, pads, discs, sleeves, patches, liners, lids, and other designs that would enable the home user and food processor to utilize susceptor materials for their own microwave suitable foods.

Preferably, however, in embodiments of the present invention the cooking vessel is a cooking bag, which is completely or substantially lined with a susceptor material. The susceptor-lined cooking bag is preferably formed from a multi-layer susceptor material, which can be appropriate folded or sealed at its edges to form the cooking vessel. The multi-layer film generally comprises a base layer of suitably flexible material, such as cellophane, a second layer of microwave-absorbing susceptor material, and a third exterior layer of suitable flexible material, such as polyester. The outer or food-contacting layer of the susceptor structure is preferably one that is approved for contact with food, so that it can directly contact the food product during storage and/or cooking.

The barrier film or surface layer of the susceptor structure is typically a polyester (PET) film, due primarily to its heat resistant properties and low cost. However, the barrier film or surface layer may also be any suitable polymer, such as any stable plastic substance. Examples of suitable substances for the barrier film or surface layer include, but are not limited to, polyesters, polyethylene, polypropylene, Kapton® polymers, polyimide, polyethylene nitrile, nylon, cellophane, cellulose, polysulphone, mixtures thereof, and the like. It is important that the material of the protective or overcoating layer 40 be of sufficient stability at high temperatures that it will not degrade during the operation of the microwave oven at the temperature selected for cooking the desired food product. According to particular embodiments of the present invention, it is preferred that the barrier film or surface layer be formed from polyester, which has been found to be a particularly well suited material in view of its cost, stability and its surface characteristics for metallization. The purpose of the barrier film or surface layer is to provide a functional barrier between the food product and as a carrier for the susceptor metal, and sometimes also to serve as a carrier for a sealable layer to facilitate formation of a package. The barrier film or surface layer can thus be any material that protects the surface of the susceptor material from damage, while still allowing sufficient thermal transfer from the metallized susceptor layer to the surface of the food product. Furthermore, such materials should be materials that are generally regarded as safe (gras) or are approved by the relevant governmental entities, if appropriate, for contact with food surfaces.

In embodiments of the present invention where the susceptor material is forming an entire or part of a package, the top layer of the material, such as the barrier film or surface layer, can be a polyester film. Alternatively, in embodiments, the top layer of the material can be a heat sealable polymer or be further coated with a sealable material, for example a heat-sealable or cold-sealable material. These embodiments facilitate easier fabrication of the packages. For example, the susceptor materials of the present invention can be conveniently used in conventional "flow wrap" processes, where the susceptor material can be easily formed and sealed on vertical or horizontal flow wrap machines.

Furthermore, in the above-described embodiments where the material includes a heat-sealable layer, where the barrier film or surface layer comprises two polyester layers, one of which forms the heat-sealable layer, for sealing a part of the layer to another part of the layer as in flow wrap or form fill and seal machines other adhesive mediums can be applied to achieve sealing action between the barrier film or surface layer and the sealable material and also between the barrier film or surface layer and the substrate. Examples of suitable films include, but are not limited to Dupont OL, ICI 850 and Mylar film. Typically, such flow wrap or form fill and seal machines utilize a co-extruded, two-layer (typically PET) with the outer layer being heat-sealable. These adhesives are subject to the design, form, and shape of the food vessel and surround. These adhesives can be any suitable adhesive materials generally known in the art, and can include, for example, "hot-melt" adhesives, "cold" adhesives, hot-tack adhesives, extrusion laminating, and the like.

A metallized susceptor layer that forms the operational part of the susceptor is applied onto the barrier film or surface layer, then an adhesive can be applied to the metallized layer to apply the base layer. The material used for the susceptor may be any of the variously known or after-developed materials in the art and that functions as a susceptor in microwave ovens. Such materials include, but are not limited to, metals such as elemental metals, metal alloys, combinations of metals and/or alloys, oxides thereof, derivatives thereof, and the like. In particular, the material used to form the susceptor can be aluminum, copper, tin, silver, nickel, zinc, any of the various types of stainless steel, nickel-chromium alloy, titanium, Inconel, alloys of the foregoing materials, oxides of the foregoing materials, derivatives thereof, mixtures thereof, and the like. An example of Inconel is Inconel alloy 792, which has a composition in terms of weight percent of 13% chromium, 10% cobalt, 4.5% titanium, 4% tantallum, 4% tungsten, 3% aluminum, 2% molybdenum, 0.2% carbon, 0.1% zirconium, 0.02% boron, and a balance of nickel.

According to embodiments of the present invention, the susceptor material can be appropriately selected by one of ordinary skill in the art to provide desired heating profiles. For example, as is generally known in the art, certain susceptor materials (such as elemental metals) heat in response only to one of an electrical waveform or magnetic waveform of the incident microwave energy. However, other susceptor materials (such as many metal alloys) heat in response to both the electrical waveform and the magnetic waveform of the incident microwave energy. In embodiments, it is preferred that the susceptor material heats in response to both the electrical and magnetic waveforms of the incident microwave energy, as this provides faster heating and higher thermal flux, thereby improving the cooking process.

The metallized layer may be applied by any of the various known or after-developed methods in the art. Suitable methods include, but are not limited to, sputtering deposition, evaporative deposition, vacuum vaporization, rotary printing, electroless or electrolytic deposition, electron beam sputtering, and the like. In embodiments of the present invention, vacuum vaporization is particularly preferred because it permits the high throughput permitted by the process.

The susceptor material may be applied in any pattern to the supporting structure. Thus, for example, the susceptor material may be applied in a manner of full coverage, where a solid layer is formed, or it may be applied in a patterned manner, where there exists both areas with susceptor material and areas without susceptor material. Where a pattern of the susceptor material is used, any suitable or desired pattern can be employed, including but not limited to stripes, checker-board, concentric rings, and the like. Such patterns can be formed, for example, by such methods as dematalization processes, including selective demetallizing which combines shielding some areas and also providing susceptor heat in other areas of the packaging surface layout, in-chamber masking, pre-printing prior to metallization, and the like. For example, acid etching may be used to provide variations in susceptor radiant heat in the final product layout. In these manners, the susceptor layer can be full thickness in some areas, partial thickness in some areas, and/or completely removed in some areas to provide the desired radiant heating profile.

As is well known in the art, the susceptor material may be applied in any suitable thickness or pattern to provide the desired heating characteristics. Preferably, however, the susceptors of the present invention are formed such that the metallized layers have a thickness whereby the temperature of the surface layer of the susceptor material can reach and remain at, but preferably does not exceed, about 210° C. (about 410° F.), and preferably within the range of from about 182 to about 205° C. Thus, for example, in embodiments of the present invention where aluminum is used as the metallized layer, it is preferred that in producing the susceptor of the present invention, the metallized layer thickness be controlled so as to have an optical density (O.D.) within the range of from about 0.14 to about 0.3, preferably from about 0.19 to about 0.25, and most preferably about 0.22. Such aluminum layers provide a susceptor material that limits the dielectric heating of the susceptor surface to within the temperature range of from about 182 to about 204° C. (about 360 to about 400° F.). Where other materials (other than aluminum) are used for the metallized layer, these thicknesses will of course vary in accordance with the particular material being used. Thus, for example in embodiments where metal alloys, such as stainless steel alloys, nickel-chrome alloys, and the like, are used to form the susceptor layer, the susceptor layer preferably has the same operation parameters as described above for the aluminum layer.

Furthermore, although the above discussion focuses on the use of a single susceptor layer, multiple layers can be used in embodiments of the present invention. Such multiple layers can be used, for example, to provide increased heat generation in all or part of the susceptor structure, to provide increased heat transfer to all or part of the food load. Such increased heat generation may be beneficial in instances where the food load otherwise would too quickly absorb the generated heat but not transfer sufficient quantities of such heat into the center of the food load. When multiple susceptor layers are used, they can be used in any desirable combination and in any desirable location in the susceptor structure.

Typically, the susceptor is formed by depositing the film or layer of the microwave interactive susceptor material onto the barrier film or surface layer, e.g., a web of polyester film, followed by laminating the metallized film onto a web of base or supporting substrate material, usually board, paper or cellulose. In embodiments of the present invention, the substrate may be any of the various known or after-developed supporting materials suitable for microwave susceptor materials. Thus, for example, the substrate in embodiments of the present invention can be suitably selected from, but is not limited to, paper, board, paperboard, glassine materials, cellulose, cellophane, plastics, ceramic, and the like. These materials may be either uncoated or coated as generally known in the art. Where the susceptor material is not likely to be re-used, in interest of economics the substrate is preferably formed from coated kraft paper and other conventional kraft paper combinations conventionally used for paperboard cartons and packages, including combinations of paperboard, plastic layer(s), and/or absorbent materials. For example, suitable absorbent susceptor structures are disclosed in U.S. patent application Ser. No. 10/209,907, filed Aug. 2, 2002, the entire disclosure of which is incorporated herein by reference, and such materials can be equally applied to the present invention. Preferably, the substrate material is formed of a material having a relatively high thermal capacitance and heat stability sufficient to withstand cooking temperatures without exhibiting severe scorching or charring in a microwave oven. Such materials can be, for example, either low density or high density materials, as desired. Furthermore, the substrate is preferably one that is suitable to be passed through the processing apparatus in the form either of discrete sheets or pieces, or as a continuous web. Of course, the substrate is not limited to these embodiments, and other substrate materials can be used as necessary.

Preferably, in embodiments where the microwave cooking vessel is in the form of a bag, the base or supporting substrate materials is cellophane, or other plastics material. This construction allows for flexibility of the container.

As desired, the microwave cooking vessel can be used such that it is either open or closed with respect to the surrounding atmosphere. Thus, for example, the microwave cooking vessel can be an open vessel, in the form of one or a plurality of plates or disks, an open carton or box, an open bag, a wrap or sleeve with open ends, or the like. Such open vessels can provide venting of steam or other fluids that may otherwise be generated by the food product or the cooking process. In other embodiments, the microwave cooking vessel can be a closed vessel, in the form of a closed box or carton, a closed bag, a wrap or sleeve with closed ends, or other vessels that surround the food load on all sides. Such closed vessels can prevent the venting of steam or other fluids to retain them in the immediate vicinity of the food load. Intermediate embodiments, such as where an otherwise closed container includes one or more vent holes, slits, or the like, can also be used. In still other embodiments, the microwave cooking vessel can be initially a closed vessel, but which has rupturable seams or portions that rupture as pressure inside the container rises. These containers, for example, withstand a set amount of pressure to maintain steam within the container, but rupture, preferably controllably, if the pressure exceeds a pre-determined amount. These containers can suitably be used in the present invention to maintain steam within the cooking container for a portion of the cooking process, while venting excess steam as needed.

Although described above, the materials and processes for forming susceptor cooking vessels are known in the art, and can be readily applied to the present invention based on the present disclosure. For example, various susceptor designs and methods of making the susceptors are disclosed in, for example, U.S. Pat. No. 4,641,005 to Seiferth, U.S. Pat. No. 5,614,259 to Yang et al., U.S. Pat. No. 5,164,562 to Huffman et al., U.S. Pat. No. 4,927,991 to Wendt et al., U.S. Pat. No. 5,124,519 to Roy et al., U.S. Pat. No. 5,414,248 to Phillips, and U.S. patent application Ser. No. 10/209,907 to Young et al., the entire disclosures of which are incorporated herein by reference.

In other embodiments of the present invention, the susceptor structure may also include one or more layers for elevating the food load. Such layers can be, for example, in the form of corrugated materials. For example, such corrugated layer(s) can be formed of any suitable material, including the materials described above for the base and/or surface layers. Preferably, the corrugated layer is formed of a corrugated paper, paperboard, board formed into a corrugated profile shape, board such as corrugated cardboard, or the like. Preferably, although not limited thereto, the corrugated layer is formed of a material having a weight rating of from about 20 to about 80 pounds/ream.

In the above discussion, the various layers of the susceptor structure have been described as being in a particular general order. However, the construction is not limited to those layer orders described above. For example alternative susceptor structure constructions include embodiments where the susceptor layer is located toward the inside of the structure. When so located, the susceptor layer continues to provide the effect of microwave absorption and heat generation.

A typical conventional susceptor material or microwave cooking vessel is shown in FIG. 1. As shown in FIG. 1, the susceptor generally comprises a base or substrate layer 10 such as made from plastic, cellophane, kraft paper, or SBS paper board; an adhesive layer 20; a metallized susceptor layer 30; a protective coating layer 40 of a plastic (such as polyester) or other heat stable material; and an optional heat seal layer (not shown). The food load F is placed next to or contacting with the protective coating layer 40.

Figure 2A:
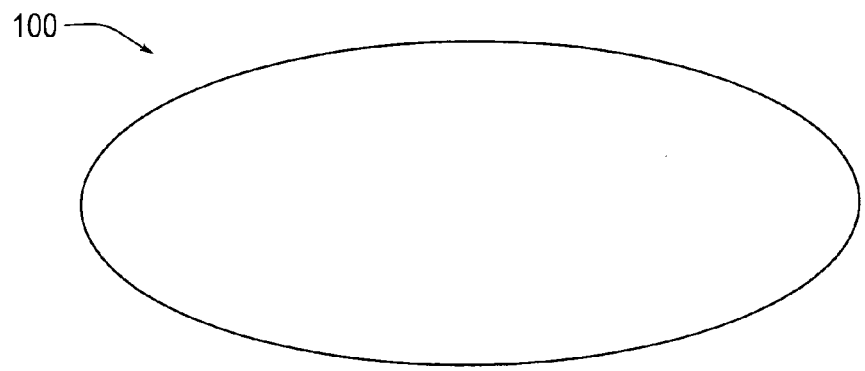
FIGS. 2a–2p show various package elements formed from a susceptor material.
Figure 2B:
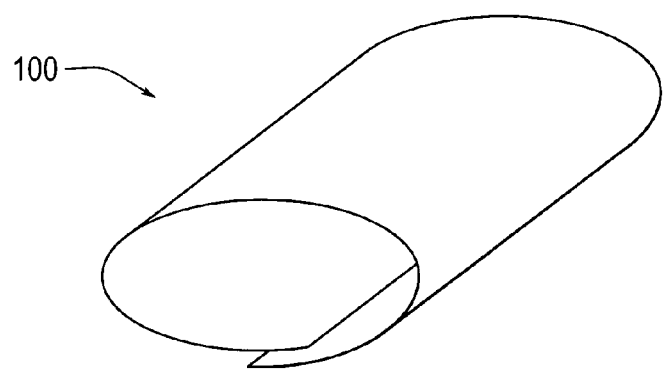
Figure 2C:
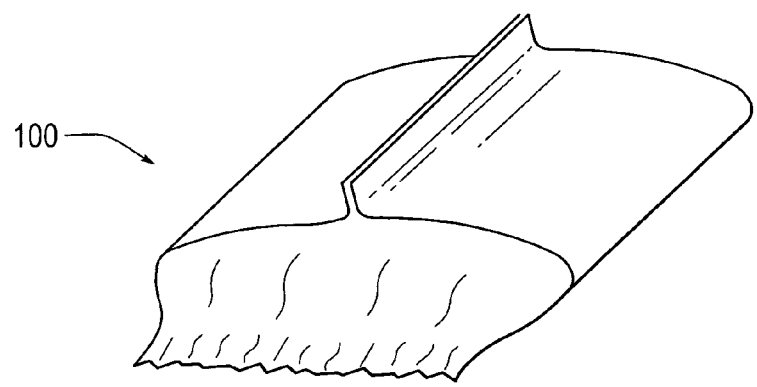
Figure 2D:
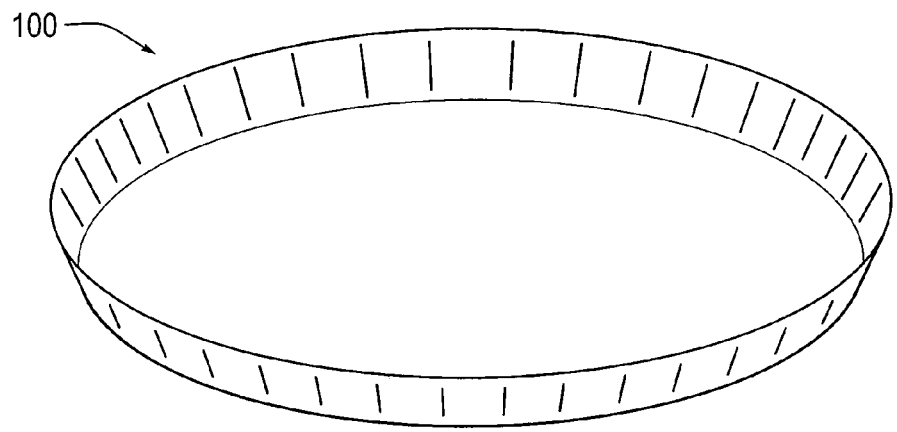
Figure 2E:
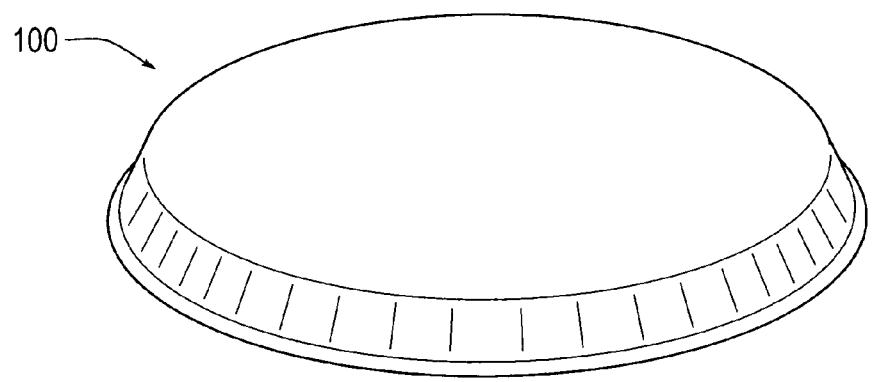
Figure 2F:
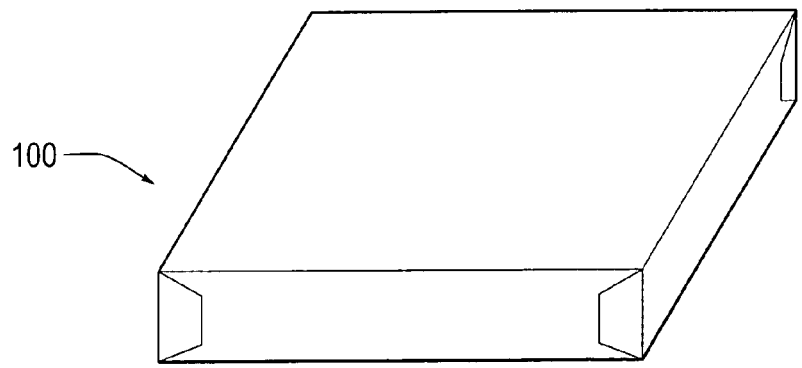
Figure 2G:
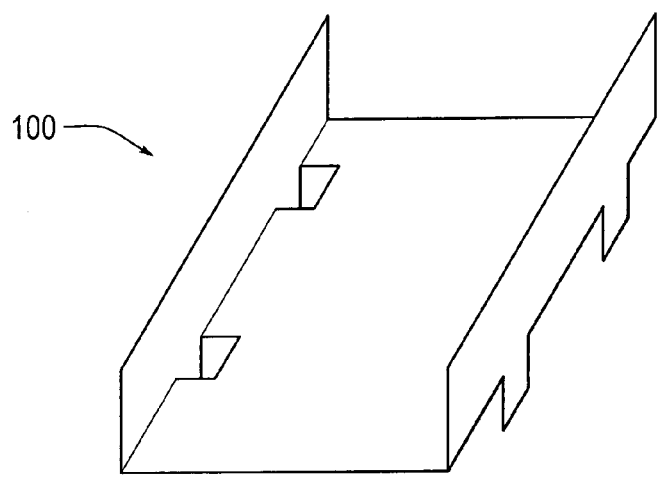
Figure 2H:
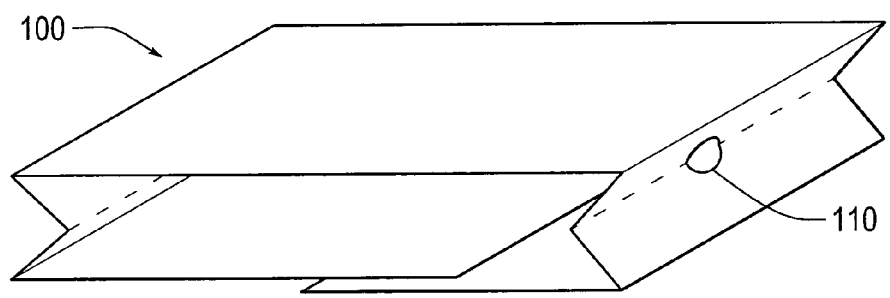
Figure 2I:
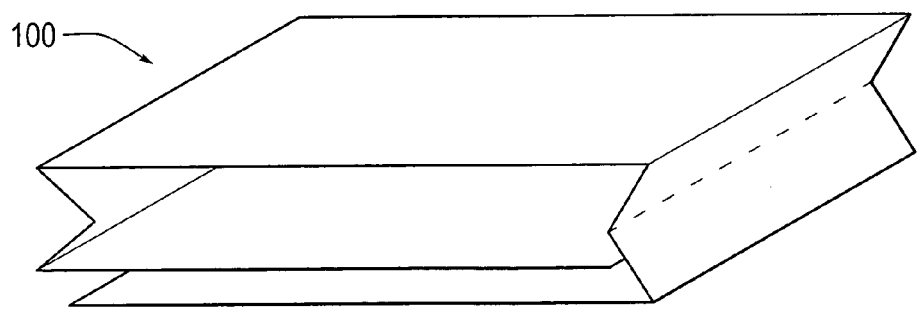
Figure 2J:
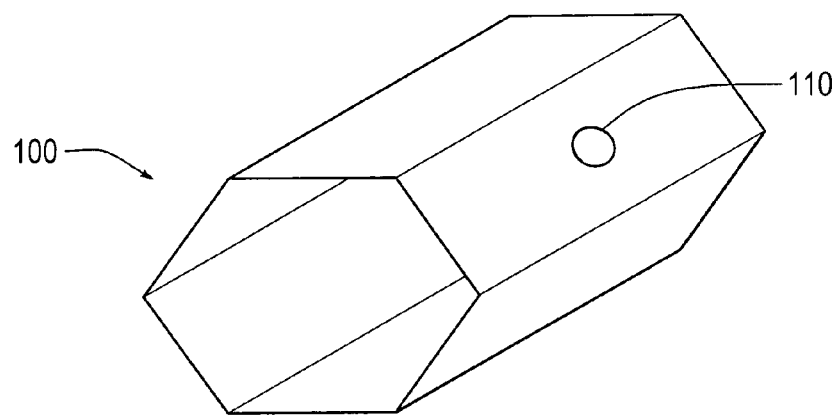
Figure 2K:
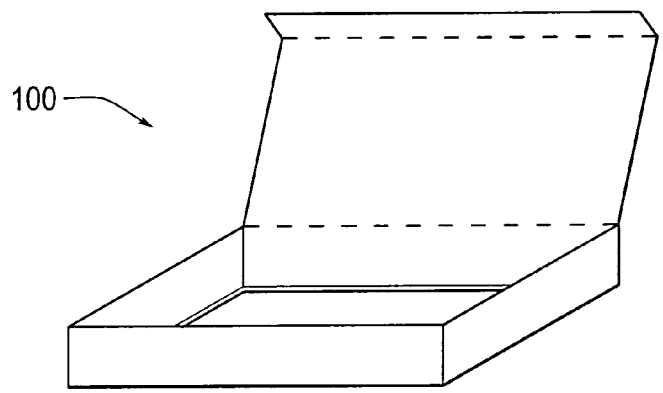
Figure 2L:
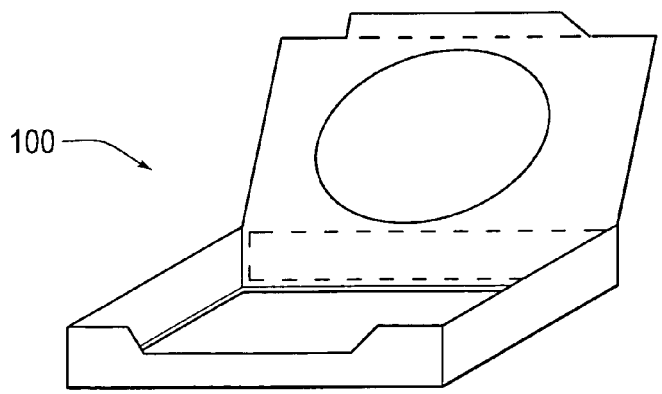
Figure 2M:
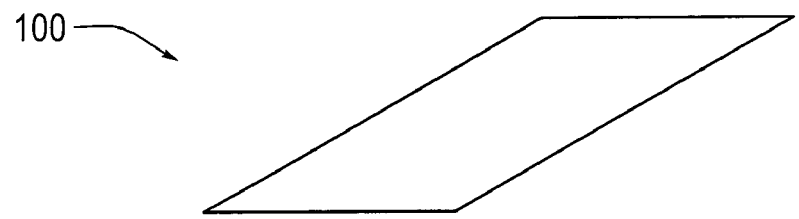
Figure 2N:
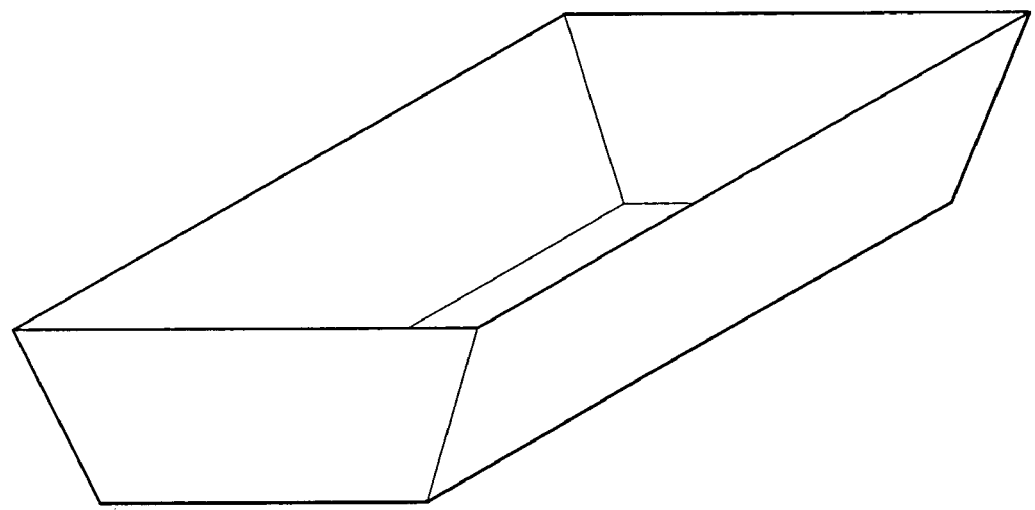
Figure 2:
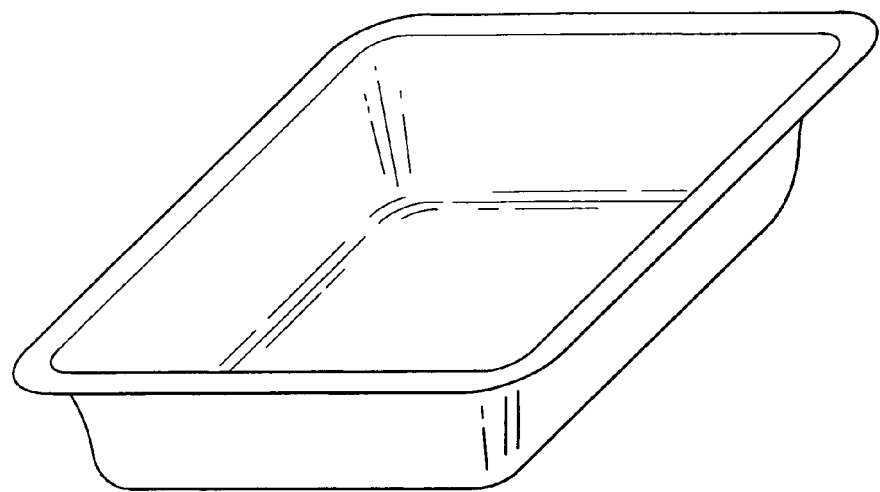
Figure 2P:
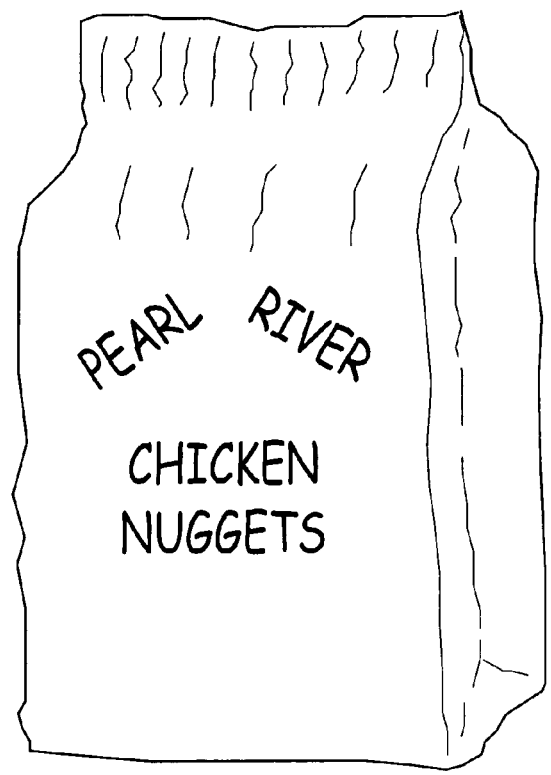

Exemplary embodiments of cooking vessels having the susceptor structure are shown in FIGS. 2a–2p. FIG. 2a shows the susceptor material formed into a disk. FIG. 2b shows the susceptor material formed into a tube. FIG. 2c shows the susceptor material formed into a flow-wrap pouch. FIG. 2d shows the susceptor material formed into a pre-formed plate or tray. FIG. 2e shows the susceptor material formed into a pre-formed tray that is reversed to provide an elevated cooking platform. FIG. 2f shows the susceptor material formed into a tray that is provided with "click-lock/sprinter" type corners that enable the tray to be assembled into an elevated cooking platform. FIG. 2g shows the susceptor material formed into a pre-formed erected tray, where the tray forms an elevated cooking platform having open ends.

FIGS. 2h–j show the susceptor material formed into sleeves, where the sleeve has open ends or flaps to partially close the ends and having a gusseted side wall or other design mechanism to provide a compression tension to draw the upper and lower surfaces toward each other. The sleeve can also have one or more vent holes 110, as shown in FIGS. 2h and 2j. FIG. 2i shows a design with double layer back layers that provide increased heat and absorbency to the base of the heating sleeve.

FIG. 2k shows the susceptor material as a pad that is patch-laminated into the bottom or other inner surface layers of the folding carton. Alternatively, a microwave absorbent pad may be positioned in the base of the carton where the absorbent qualities require a very thick absorbent layer 50 that may otherwise be unsuitable for flexible reel patch lamination processing.

FIG. 2l shows the susceptor material as a pad or disk that is patch-laminated into the bottom or underside of a carton lid, on other inner surfaces. FIG. 2m shows the susceptor material as a pad or base where the food load is positioned on the pad as a support for the product within a flexible outer pouch made on a "flow-wrap" machine. The end-user would, for example, use this microwave susceptor base to re-heat the food.

FIG. 2n shows the susceptor material formed as a uniformly angled side wall tray. FIG. 2o shows the susceptor material formed into a preformed rectangular tray. FIG. 2p shows the susceptor material formed into a bag that can be closed at the top.

To complete the cooking process, the food product and coating composition are placed in the susceptor-containing microwave cooking vessel, and the food product is cooked according to usual microwave cooking principles.

As a microwave oven, any suitable microwave oven can be used to practice the present invention. Thus, the particular microwave oven employed can be any suitable commercial (i.e., restaurant-quality) or consumer microwave oven. Suitable power levels for the microwave oven can range from low (such as from about 4 or 500 watts) to high (such as about 1,500 watts or more), and include intermediate level models of, for example, from about 700 to about 1,000 watts.

However, an important feature of the present invention is that the cooking process does not merely include microwave and radiant energy cooking of the food product. Rather, the cooking process includes a further aspect of frying, which arises due to the microwave-absorbent oil or fat contained in the coating composition. As a result of energy absorption from both the microwave gun and radiant energy generated by the susceptor material, the microwave-absorbent oil or fat contained in the coating composition quickly heats up to a temperature of about 195 to 250° C., temperatures where the oil or fat causes a frying action. At this temperature, the oil or fat adds a drying aspect to the process, which further cooks the product, while providing a crispy, fried appearance, taste and texture to the exterior of the food product. This "dry-frying" has not previously been described or appreciated in the art as an adjunct to microwave cooking.

Based on the combined heating and cooking mechanisms, in embodiments of the present invention the microwave-absorbing oil or fat in fact heats up to higher temperatures than the susceptor material itself. That is, while the susceptor preferably does not heat up above about 210° C., and preferably heats up only to about 182 to about 205° C., the microwave-absorbing oil or fat heats up to about 195–250° C. Thus, the microwave-absorbing fat or oil preferably heats up hotter than the susceptor itself, thereby providing the dry-frying cooking mechanism. However, in other embodiments, it may be preferred for the microwave-absorbing fat or oil to heat up only to about the same temperature as the susceptor itself, or to heat up to a temperature less than the temperature of the susceptor itself.

According to the present invention, a variety of benefits are provided by the cooking composition and methods.

A first advantage is that the coating composition containing the microwave-absorbing fat or oil provides not only advantages during the cooking process, but also during food storage. That is, by providing a thin coating of fat or oil on the food product, moisture transfer into or out of the food product is slowed or stopped. Thus, for example, where the food product is a pre-cooked (i.e., baked, fried, broiled, etc.) food product having a crispy crust; a partially cooked food product, where the final cooking stage is conducted in the microwave oven; or even a raw (uncooked) food product having a crispy bread coating, the microwave-absorbing fat or oil prevents moisture from softening the bread crumbs. Usually, freezer storage of such products results in moisture softening, or de-crisping, the bread crumbs. However, this process can be avoided by the present invention, thereby prolonging the crispiness of the food product.

A further advantage of the present invention is that the microwave-absorbing fat or oil provides a cooking process whereby various food products can be cooked to an individual's personal taste, where such cooking was not previously possible in a microwave oven. For example, it is generally not possible to cook raw meat products in a microwave to a "rare," "medium rare," or even "medium" state, because the microwave cooking process generally cooks the food product from the inside out. However, the coating composition of the present invention allows a user to cook a food product with a faster cooking of the outside, which in some instances will allow the preparation of such "rare," "medium rare," or even "medium" states.

Another advantage of the present invention is that certain food products can be prepared in a much healthier manner than was previously possible. For example, it is known that frying methods of the prior art typically result in the food product absorbing a major amount of the oil or fat cooking medium. This is due primarily to the large amount of fat or oil used to cook the food product. However, because the coating composition accomplishes a frying process with only a minimal amount of oil or fat, and because even not all of that oil or fat is absorbed by the food product, the fried foods of the present invention are much healthier than conventional fried foods. Furthermore, because the oil or fat content of the coating composition can be altered to taste, the oil or fat content of the final product can likewise be altered, as desired.

A related benefit of the present invention is that the cooking process and materials are much cleaner than conventional frying. In contrast to conventional frying, which typically utilizes a large open pan of fat or oil, the present invention uses a small amount of fat or oil, which is contained within the microwave cooking vessel. Where the microwave cooking vessel is a bag, as preferred, the minor amount of oil or fat remains contained within the bag. The results is that the present invention reduces or avoids the issues of oil splatter, used oil disposal, fire and burn hazards, and the like.

The following examples are illustrative of embodiments of the present invention, but are not limiting of the invention. It will be apparent, however, that the invention can be practiced with many types of materials and can be formed into different structures for a variety of different uses in accordance with the disclosure above and as pointed out hereinafter.

EXAMPLES

Example 1

A susceptor according to the present invention is produced as follows. First, cellophane is used as a substrate layer. Next, a layer of an Inconel alloy (a nickel-chrome alloy) is vacuum deposited onto a thin polyester protective film to a thickness suitable for microwave cooking. To the metallized polyester film having a heat-seal layer is applied a layer of adhesive. The adhesive layer is then applied to the cellophane to form the final product. The susceptor structure is folded and sealed to form a bag having an open end for receiving the food load.

A coating composition is prepared by mixing palm fat, bread crumbs, artificial grill seasoning, and a conventional browning mix. The coating composition is applied to a thawed, raw chicken drumstick, to provide an amount of 15% palm fat by weight of the chicken drumstick.

The susceptor and coated drumstick is cooked in a typical consumer microwave oven of about 1,000 watts power for a period of 5½ minutes. The chicken is fully cooked and has a juicy interior. The breading is crispy, browned and fried and has the appearance of a conventional fried chicken drumstick.

Example 2

The same coating composition and susceptor as used in Example 1 is used to cook a raw boneless pork chop. The coating composition is applied to a thawed, raw boneless pork chop, to provide an amount of 15% palm fat by weight of the pork chop. The susceptor and coated pork chop are cooked in a typical 1,000-watt consumer microwave oven for a period of 4½ minutes. The pork chop is fully cooked and has a juicy interior. The breading is crispy, browned and fried and has the appearance of a conventional fried pork chop.

Example 3

The same coating composition and susceptor as used in Example 1 is used to cook breaded sliced okra. The coating composition is applied to the thawed okra, to provide an amount of 15% palm fat by weight of the okra. The susceptor and coated okra are cooked in a typical 1,000-watt consumer microwave oven for a period of 3 minutes. The okra is fully warmed, and the breading is crispy, browned and fried and has the appearance of conventional fried okra.

Example 4

The same coating composition and susceptor as used in Example 1 is used to re-heat a pre-cooked, frozen, breaded fish filet. The frozen breaded fish filet is provided with the coating composition already applied by the food processor, where the coating composition is present in an amount of about 15% palm fat by weight of the fish filet. The susceptor and coated fish filet are heated in a typical 1,000-watt consumer microwave oven for a period of 4 minutes. The fish filet is fully thawed and heated through, and has a juicy interior. The breading is crispy, browned and fried and has the appearance of a conventional fried fish filet.

Example 5

The same susceptor as used in Example 1 is used to cook a serving of buffalo-style wings. A coating composition is prepared by mixing vegetable oil with buffalo-style wing sauce. The coating composition in a thick liquid form is applied to six thawed chicken buffalo-wing sized pieces, to coat the pieces and provide an amount of about 12% oil by weight. The susceptor and buffalo wings are heated in a typical 1,000-watt consumer microwave oven for a period of 5 minutes. The cooked wings are fully cooked, have a fried texture beneath the applied sauce, and have a thick buffalo-style sauce over the meat.

Comparative Example 1

Following the same steps as in Example I, a similar chicken drumstick is prepared in a similar susceptor bag, but using a conventional coating composition. The coating composition includes bread crumbs, artificial grill seasoning, and a conventional browning mix, but does not include the palm fat. As in Example 1, the coating composition is applied to the thawed, raw chicken drumstick, to provide a coating equivalent in amount to the coating composition in Example 1.

The susceptor and coated drumstick is cooked for a period of 5½ minutes. The chicken is not fully cooked, and although the breading is browned, it is not fried and is not crispy.

Comparative Example 2

Following the same steps as in Example 2, a similar raw boneless pork chop is prepared in a similar susceptor bag, but using a conventional coating composition. The coating composition includes bread crumbs, artificial grill seasoning, and a conventional browning mix, but does not include the palm fat. As in Example 2, the coating composition is applied to the raw boneless pork chop, to provide a coating equivalent in amount to the coating composition in Example 2.

The susceptor and coated pork chop is cooked for a period of 4½ minutes. The pork chop is not fully cooked, and although the breading is browned, it is not fried and is not crispy.

Comparative Example 3

Following the same steps as in Example 3, similar sliced okra is prepared in a similar susceptor bag, but using a conventional coating composition. The coating composition includes bread crumbs and a conventional browning mix, but does not include the palm fat. As in Example 3, the coating composition is applied to the sliced okra, to provide a coating equivalent in amount to the coating composition in Example 3.

The susceptor and coated sliced okra is cooked for a period of 3½ minutes. The okra is fully warmed throughout, but the breading is soggy.

Comparative Example 4

Following the same steps as in Example 4, a similar pre-cooked, frozen, breaded fish filet is prepared in a similar susceptor bag, but using a conventional coating composition. The coating composition includes bread crumbs, seafood seasoning, and a conventional browning mix, but does not include the palm fat. As in Example 4, the coating composition was previously to the pre-cooked, frozen, breaded fish filet, to provide a coating equivalent in amount to the coating composition in Example 4.

The susceptor and coated pre-cooked, frozen, breaded fish filet is cooked for a period of 4 minutes. The fish filet is fully warmed through, but is not as juicy as the fish filet of Example 4. Moisture from the interior of the fish filet appears to have migrated into the coating mix during frozen storage. Although the breading is browned, it is not fried and is not crispy.

As will be apparent to one of ordinary skill in the art, numerous changes, alterations and adjustments can be made to the above-described embodiments without departing from the scope of the invention, and the invention is in no way limited to the specific exemplary embodiments described above. One skilled in the art will recognize that the various aspects of the invention discussed above may be selected and adjusted as necessary to achieve specific results for a particular application. Thus, the foregoing embodiments are intended to illustrate and not limit the present invention. It will be apparent that various modifications can be made without departing from the spirit and scope of the invention.

What is claimed is:

1. A microwave dry-fry cooking process, comprising:
   providing a food product in or on a microwave cooking vessel, wherein said food product comprises a food load and a coating composition coated directly on said food load, said coating composition comprises at least one microwave-absorbing oil or fat; and
   exposing said food product in or on said microwave cooking vessel to microwave energy in a microwave oven, wherein said exposing step causes said at least one microwave-absorbing oil or fat to heat to a temperature of from about 175° C. to 300° C., and
   wherein said at least one microwave-absorbing oil or fat is present in an amount of from about 1% to about 20% by weight of the food load, and
   wherein said microwave cooking vessel comprises a layer of a microwave susceptor material.

2. A process according to claim 1, wherein said microwave susceptor material heats in response to only one of an electrical waveform of said microwave energy or a magnetic waveform of said microwave energy.

3. A process according to claim 1, wherein said microwave susceptor material heats in response to both an electrical waveform of said microwave energy and a magnetic waveform of said microwave energy.

4. A process according to claim 1, wherein said microwave susceptor material comprises at least one material selected from the group consisting of elemental metals, metal alloys, combinations of metals and alloys, oxides thereof, derivatives thereof, and mixtures thereof.

5. A process according to claim 1, wherein said microwave susceptor material comprises at least one material selected from the group consisting of aluminum, copper, tin, silver, nickel, zinc, stainless steel, nickel-chromium alloy, titanium, alloys of the foregoing materials, oxides of the foregoing materials, derivatives thereof, and mixtures thereof.

6. A process according to claim 1, wherein said microwave susceptor material comprises at least one material selected from the group consisting of aluminum, stainless steel, nickel-chrome alloys, and mixtures thereof.

7. A process according to claim 1, wherein said microwave cooking vessel is a bag comprising a layer of a microwave susceptor material.

8. A process according to claim 7, wherein said bag is formed from a multi-layer sheet comprising a plastic surface layer, and intermediate susceptor layer, and a plastic base layer, wherein said plastic surface layer contacts said food product.

9. A process according to claim 8, wherein said multi-layer sheet comprises:
   a polyester surface layer, having an optional heat-seal layer;
   an intermediate susceptor layer comprising a susceptor material selected from the group consisting of elemental metals, metal alloys, and mixtures thereof and
   a cellophane base layer.

10. A process according to claim 1, wherein said microwave cooking vessel is selected from the group consisting of a plate, a disk, a pair of plates or disks to be disposed on different or opposite sides of a food product, a wrap product to loosely or fittingly wrap about the food product, a box, a carton, a bag, a bowl, a covered or uncovered microwave cooking container, a pouch, a sleeve, a tray, a pad, and a patch.

11. A process according to claim 1, wherein said coating composition further comprises at least one material selected from the group consisting of flavorants, colorants, browning agents, and breading agents.

12. A process according to claim 1, wherein said food load is raw and said exposing step cooks said food product.

13. A process according to claim 1, wherein said food load is pre-cooked and said exposing step re-heats said food product.

14. A process according to claim 1, wherein said exposing step causes said at least one microwave-absorbing oil or fat to heat to said temperature of from about 175° C. to 300° C. in less than about 2 minutes.

15. A process according to claim 1, wherein said exposing step causes said at least one microwave-absorbing oil or fat to heat to said temperature of from about 175° C. to 300° C. in less than about 1 minute.

16. A process according to claim 1, wherein said exposing step causes said at least one microwave-absorbing oil or fat to heat to a temperature of from about 195° C. to 250° C.

17. A process according to claim 16, wherein said exposing step causes said coating composition to fry said food load.

18. A process according to claim 1, wherein said exposing step causes said at least one microwave-absorbing oil or fat to heat to a temperature that is higher than a temperature of said microwave cooking vessel.

19. A process according to claim 1, wherein said exposing step causes said at least one microwave-absorbing oil or fat to heat to a temperature that equal to or less than a temperature of said microwave cooking vessel.

20. A process according to claim 1, wherein said at least one microwave-absorbing oil or fat is derived from animal sources.

21. A process according to claim 1, wherein said at least one microwave-absorbing oil or fat is derived from vegetable sources.

22. A process according to claim 1, wherein said at least one microwave-absorbing oil or fat is a synthetic oil or fat.

23. A process according to claim 1, wherein said at least one microwave-absorbing oil or fat is solid at room temperature.

24. A process according to claim 1, wherein said at least one microwave-absorbing oil or fat is selected from the group consisting of coconut oil, corn oil, cottonseed oil, fatty-pork tissue, lard, palm oil, shortening, safflower oil, sunflower oil, tallow, palm fat, soybean oil, sunflower oil, rape seed oil, and mixtures thereof.

25. A process according to claim 1, wherein said coating composition comprises a microwave-absorbing fat.

26. A process according to claim 1, wherein said exposing step cooks said food product, and said food product has a crisp outer surface.

27. A process according to claim 1, wherein said at least one microwave-absorbing oil or fat is present in an amount of from about 5% to about 18% by weight of the food load.

28. A process according to claim 1, wherein said food load is selected from the group consisting of meat products, fruits, dough-based products, and baked products.

* * * * *